United States Patent [19]

Dagard et al.

[11] Patent Number: 4,756,876
[45] Date of Patent: Jul. 12, 1988

[54] MODULAR ULTRAFILTRATION DEVICE FOR THE COOLING LIQUID OF A NUCLEAR REACTOR

[75] Inventors: Philippe Dagard, Marly le Roi; Jacques Riviere, Colombes, both of France

[73] Assignee: Framatome, Courbevoie, France

[21] Appl. No.: 867,991

[22] Filed: May 29, 1986

[30] Foreign Application Priority Data

May 29, 1985 [FR] France ................................ 85 08055

[51] Int. Cl.⁴ .............................................. G21C 1/01
[52] U.S. Cl. .................................... 376/313; 210/181; 376/289
[58] Field of Search ................. 376/289, 313; 210/181, 210/184

[56] References Cited

U.S. PATENT DOCUMENTS

| | | | |
|---|---|---|---|
| 1,204,602 | 11/1916 | Speller | 210/181 |
| 2,207,347 | 7/1940 | Hughes | 210/181 |
| 2,745,552 | 5/1956 | Bruggeman et al. | 210/181 |

FOREIGN PATENT DOCUMENTS

| | | |
|---|---|---|
| 2700966 | 7/1978 | Fed. Rep. of Germany . |
| 1211614 | 3/1960 | France . |
| 1259400 | 3/1961 | France . |
| 2463970 | 2/1981 | France . |
| 2552419 | 12/1985 | France . |
| 308278 | 11/1929 | United Kingdom ................ 210/181 |

Primary Examiner—Deborah L. Kyle
Assistant Examiner—Richard W. Wendtland
Attorney, Agent, or Firm—Pollock, Vande Sande & Priddy

[57] ABSTRACT

Modular ultrafiltration device for the cooling liquid of a nuclear reactor, comprising a radiation absorbing containment (1), an ultrafilter (15) arranged in the containment (1), a heat exchanger (32) placed in the containment (1), and connection pieces intended for the various parts of the ultrafilter (15) and heat exchanger (32) and passing through the wall of the containment (1) in a leak-proof manner. A heat-insulating material (41) fills the inner volume of the containment (1). The modular device can easily be connected to an auxiliary circuit of the nuclear reactor. The ultrafiltration wall can be replaced without any difficulty.

7 Claims, 1 Drawing Sheet

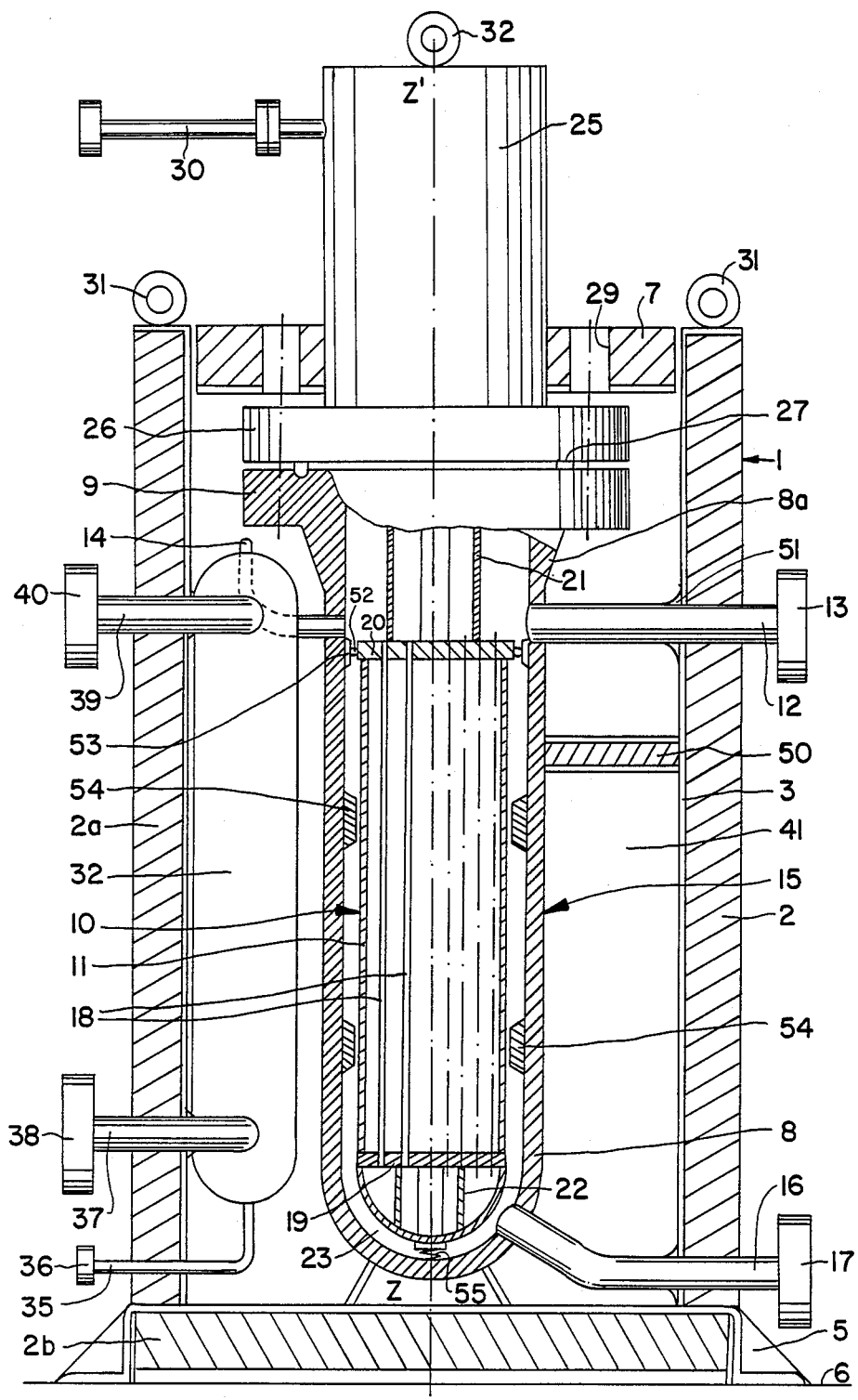

MODULAR ULTRAFILTRATION DEVICE FOR THE COOLING LIQUID OF A NUCLEAR REACTOR

FIELD OF THE INVENTION

The invention relatesto a modular ultrafiltration device for the high-temperature and high-pressure cooling liquid of a nuclear reactor.

BACKGROUND OF THE INVENTION

Pressurized-water nuclear reactors incorporate a primary circuit, in which the pressurized water cooling the fuel assemblies of the reactor core circulates. The primary circuit communicates with the inner volume of the vessel containing the core and has primary-fluid circulation pumps, steam generators and a pressurizer, which are connected by means of large-diameter and pressure-resistant pipelines. The primary fluid of the reactor can also be made to circulate in certain auxiliary circuits which allow it to be treated and to have its physical or chemical characteristics modified.

During its circulation in the primary circuit or in the auxiliary circuits, the cooling fluid comes in contact with many components, most of which are made of or covered with a nickel alloy making it possible to limit the extent to which they are attacked by the primary fluid. However, some components, such as the seats of valves or of cocks, or even certain portions of piping, experience a certain wear, with the result that the primary fluid becomes laden with particles of very small dimensions which become detached from these components. These particles tend to circulate together with the primary fluid and therefore pass through the reactor core, where they are subjected to intense neutron bombardment, the effect of which is to activate them. In particular, wear-resistant alloys containing a certain proportion of cobalt cause highly activated particles to occur. These particles accumulate in certain parts of the reactor components, and this presents problems which are very difficult to solve during the maintenance operations on the reactor, because these operations require preliminary decontamination phases which are very difficult to carry out.

On the other hand, the make-up water and additives introduced into the primary fluid by means of an auxiliary circuit, such as the volumetric and chemical monitoring circuit, likewise contains solid particles of various origins which are activated when the primary fluid passes through the reactor core.

It is therefore necessary to treat the primary fluid periodically or continuously to reduce the content of activated or activatable particles therein. These particles have a mean diameter of 0.5 microns, a considerable proportion of particles having a diameter of the order of 0.1 microns. These particles can also occur in colloidal form, i.e., in the form of a non-crystallized gel.

The fluid therefore has to be purified by means of a process, such as ultrafiltration, more particularly by means of hot ultrafiltration, since the solubility of the pollutant products is higher when cold than when hot.

It has therefore been proposed to use hot-ultrafiltration processes on the primary fluid at its operating temperature and pressure in the reactor, so that it could be purified during the operation of the reactor. Such a process was described in French Pat. No. 83-15130 in the name of the present assignee. This patent also describes an ultrafiltration device which can be inserted in the circulation of the primary fluid, within the containment shell of the reactor. Such an ultrafiltration device, through which a fluid passes at a temperature in the neighborhood of 320° and at a pressure of the order of $155 \times 105$ Pa, has a pressure-resistant casing of very great thickness, which is made of a material resistant to the corrosive action of the primary fluid and its additives. However, such an ultrafilter is designed in one piece, the ultrafiltration wall consisting of tubes fastened at their ends to tube plates, themselves welded to the pressure-resistant casing of the ultrafilter. This gives rise to difficulties in maintaining and repairing the filter, for example when the tubes forming the ultrafiltration wall are clogged or damaged.

On the other hand, installing the ultrafilter in the containment shell of the reactor containing the primary circuit and taking it off from the primary circuit or from an auxiliary circuit of the reactor makes it necessary to carry out complex operations and alters the construction program for the nuclear reactor. Likewise, replacing the ultrafilter of a reactor which has been in operation requires lengthy and difficult operations both during the removal of the filtr to be replaced, the maerials of which are activated, and during the fitting of the new filter.

These operations are all the more complex because the ultrafilter is inserted in an ultrafiltration circuit incorporating components, such as pumps, heat exchangers, depressurizers and valves. Both these components and the connecting pipework have to be carefully heat-insulated and placed in protected spaces within the containment shell, since they are intended for receiving a liquid which is at a very high temperature and a very high pressure and which transports activated particles. In particular, great precautions must be taken in the design and assembly of the part of the ultrafiltration circuit receiving the concentrate which usually incorporates a pump and a heat exchanger for cooling the concentrate.

SUMMARY OF THE INVENTION

The object of the invention is, therefore, to propose a modular ultrafiltration device for the hightemperature and high-pressure cooling liquid of a nuclear reactor, which can be fitted and removed easily, has very good thermal and biological protection and allows easier maintenance of its actual ultrafiltration part.

To achieve this object, the ultrafiltration device according to the invention comprises:

a containment, the walls of which are of great thickness and made of a radiation absorbing material, and which incorporates a removable cover, an ultrafilter which is arranged inside the containment and has at one of its ends an orifice provided with a connecting flange, and which contains an ultrafiltration assembly, which can be introduced or removed via the orifice in the casing, and an inlet connection piece for the liquid to be purified, a filtrate-outlet connection piece and a concentrate-outlet connection piece which pass through the pressure-resistant casing, a concentrate circulation pump fastened to the removable cover of the containment and incorporating a connecting flange matching the connecting flange of the pressure-resistant casing, to form together with this casing, when the removable cover and the pump are in the operating position, a closed and leak-proof volume in which the concentrate is made to circulate by means of the pump, a heat exchanger placed in the containment and connected to the concentrate-outlet connection piece, which penetrates into the heat exchanger cooling the concentrate, as well as to a cooled-concentrate discharge connection piece and to an inlet connection piece and an outlet connection piece for the cooling fluid, connecting means fastened respectively to the inlet connection piece for the liquid to be purified, to the filtrateoutlet connection piece, to the concentrate-discharge connection piece and to the inlet and outlet connection pieces for the cooling fluid, outside the containment, these connection pieces passing through the wall of the containment in a leak-proof manner, and a heat-insulating material in divided form which fills the free volume of the containment.

BRIEF DESCRIPTION OF THE DRAWINGS

In order that the invention may be more clearly understood, an embodiment of a modular ultrafiltration device for the cooling water of a pressurized-water nuclear reactor will now be described by way of non-limiting example, with reference to the single figure, which shows a vertical sectional view of the modular ultrafiltration device according to the invention.

The drawing shows the containment 1 of the modular device which consists of walls 2 of great thickness made of lead, covered on ther inner faces with a steel sheet 3. The containment 1 comprises a side wall 2a and a bottom 2b which are connected to one another so as to form a shaft of vertical axis ZZ', the bottom of which is closed in a leak-proof manner by means of the sheets 3 covering the walls 2a and 2b. Reinforced angle pieces 5 are fastened to the edges of the bottom 2b, to constitute the supports of the modular ultrafiltration device. These angle pieces are perforated with holes making it possible to fasten the device on a supporting surface 6 by means of screws.

The orifice located in the upper part of the containment 1 is closed by means of a cover 7.

Inside the containment 1, the ultrafilter 15 is retained by means of an assembly of beams 50 arranged radially and fastened on the one hand to the outer wall of the casing 8 of the ultrafilter and on the other hand to the steel sheet 3 covering the inside of the containment 1; the dimensions of these beams make it possible to absorb forces, such as those generated by a seismic shock or in the event of an accident of any kind. The casing 8, which is symmetrical in terms of revolution and which is arranged in the containment 1 with its axis coinciding with the axis ZZ', comprises a cylindrical central part, integral with a connecting flange 9 of great thickness, and a rounded bottom. The casing 8 contains an ultrafiltration assembly 10 which can be introduced into this containment 8 or removed via its upper orifice 8a. Three connection pieces pass through the wall of the casing 8: an inlet connection piece 12 for water to be purified and a concentrateoutlet connection piece 14, both in the upper part of the casing, and a filtrate-outlet connection piece 16 in the lower part of the casing 8. The connection pieces 12 and 16 pass through the side wall 2a of the containment 1 in a leak-proof manner by means of a metal membrane 51 welded, on the one hand, to the inner wall 3 of the containment and, on the other hand, to the corresponding connection piece, and on the outside of the containment 1 are integral with connecting flanges 13 and 17, respectively.

There will now be a brief description of the ultrafiltration assembly 10 and its arrangement inside the casing 8, the ultrafilter 15 consisting of the casing 8, its connection pieces and the elements arranged inside the casing 8 being of a new type described in a patent application filed on the same day as the present application.

The ultrafiltration assembly 10 consists of a cylindrical casing 11 with a rounded bottom, inside which is placed the ultrafiltration wall consisting of an assembly of vertical tubes 18, the ends of which are fastened on the inside of two tube plates 19 and 20 respectively.

The upper tube plate 20 is machined on its periphery to form a groove which receives an O-ring gasket 52 interacting with a gasket bearing surface 53 attached to the inner surface of the casing 8. Centering pieces 54 integral with the inner surfaces of the casing 8 ensure that the casing 11 is retained transversely. The rounded bottom of the casing 11 bears on the bottom of the casing 8 by means of a spring 55.

Arranged above the plate 20 is a partitioning 21 which makes it possible to delimit several compartments in the inner volume of the casing 8 above the plate 20. In the same way, a partitioning 22 makes it possible to delimit several compartments in the part of the casing 11 located underneath the tube plate 19.

The ultrafilter 15 operates as follows: The water to be purified is introduced into the casing 8 via the connection piece 12, inside one of the compartments delimited by the partitioning 21. The water to be purified penetrates into the ultrafiltration tubes and then circulates inside these tubes 18 in one direction and then the other as a result of the relative arrangement of the partitionings 21 and 22. The liquid circulating in the tubes 18 constitutes the concentrate, the impurity content of which increases, and filtrate consisting of pure water passes through the walls of the tubes and enters the inner volume of the casing 11 between the tube plates 19 and 20. A partitioning (not shown) also allows the filtrate to circulate in this space of the ultrafiltration assembly. The last compartment in the circulation of the filtrate communicates via an orifice passing through the casing 11 with the space provided between the casings 8 and 11. The filtrate is discharged through the connection piece 16 which communicates with the space.

The last compartment arranged in the circulation of the concentrate and above the plate 20 communicates with the concentrate-outlet connection piece 14.

A pump 25 for circulating the water to be purified and the concentrate is fastened to the removal cover 7 of the containment 1. This pump incorporates a connecting flange 26 matching the flange 9 of the ultrafilter 15. the flanges 9 and 26 have holes in matching positions for the passage of bolts or fastening screws. A gasket 27 is inserted between the two flanges during assembly, with the result that the pump 25 and its flange 26 ensure the leak-proof closure of the upper part of the casing 8. The pumping and circulation of the concentrate are carried out by means of the pump 25, of which the necessary junctions with the corresponding compartments delimited by the partitioning 21 are provided.

Holes 29 pass through the cover 7 in line with the fastening screws of the flanges 9 and 26, to allow these flanges to be fitted and removed. The pump 25 is cooled by a cooling fluid penetrating into the pump housing via a pipeline 30. Lifting rings 31 and 32 respectively are fastened to the containment 1 and to the pump 25, thus making it possible either to transport the molded assembly by means of the rings 31 or to transport the pump 25 by means of the rings 32 and gain access to the tube bundle.

A cylindrical heat exchanger 32 with a rounded bottom, making it possible to cool the concentrate, is mounted inside the containment 1. The concentrate-outlet connection piece 14 penetrates in a leak-proof manner inside the casing of the heat exchanger 32, where it is connected to an exchange tube, the other end of which is connected to a concentrate-discharge connection piece 35. The connection piece 35 passes through the containment 1 so as to be connected on the outside of this containment 1 to a connecting flange 36. Cooling fluid is introduced into the casing of the exchanger 32 via a connection piece 37 and is recovered via a connection piece 39, and the connection pieces 37 and 39, because of welded sealing membranes 51, pass in a leak-proof manner through the side wall 2a of the containment 1, to be connected outside this containment to connecting flanges 38 and 40, respectively.

A heat-insulating material in divided form 41 fills the free volume of the containment 1 outside the elements located within this containment 1.

The modular ultrafiltration device just described can be mounted very easily inside the containment shell of a nuclear reactor, for example in order to be arranged on an ultrafiltration loop taken off from an auxiliary primary-fluid treatment circuit, to constitute an ultrafiltration circuit of a new structure, such as that described in a patent application filed on the same day as the present application. All that is necessary, in fact, is to place the modular ultrafiltration device at the desired location by using a lifting means attached to the rings 31. The module is subsequently secured in place by means of its supports 5. The connection pieces are then connected up, by means of the corresponding connecting flanges, to the corresponding pipes provided for this purpose. The module, assembled in the way shown in the drawing, incorporates all the necessary active elements of the ultrafiltration loop and can be connected to the auxiliary primary-fluid treatment circuit purely by means of passive elements. It is quite clear that the modular device can be removed very simply and very quickly, and the module as a whole provides biological protection because of the very thick lead walls 2.

Furthermore, the modular device in itself provides good thermal insulation for its elements, in which the primary water circulates, by means of the material in divided form 41.

On the other hand, one of the essential advantages of the modular device according to the invention is that it makes it possible to separate and extract the ultrafiltration assembly easily, in order to service it, repair it or replace its tubular ultrafiltration wall. All that is necessary for this purpose, in fact, is to separate the flanges 9 and 26 from outside the containment 1 and then lift the cover 7 and the flange 26 by means of the ring 32 of the pump 25, to gain access to the inner part of the casing 8 containing the partitioning 21 and the ultrafiltration assembly 10. The filter can be refitted very easily and very quickly by means of operations carried in reverse order to the removal operations, for example after the ultrafiltration assembly 10 has been replaced.

The invention is not limited to the embodiment which has been described. The thick-walled containment can be made in a different form, and the components constituting the module can be placed in different respective arrangements.

For example, the arrangement of the ultrafilter 15 can be completely reversed, the liquid to be purified entering in its lower part and the filtrate being discharged in its upper part.

Finally, the modular ultrafiltration device according to the invention can be used in any nuclear reactor, the cooling liquid of which is at a high temperature and a high pressure.

What is claimed is:

1. In a nuclear reactor having a liquid coolant at a high pressure of the order of $155.10^5$ Pa and at a high temperature of the order of 320° C., a modular ultrafiltration device comprising
    (a) a containment the walls of which are made of a material absorbing radiation, said containment incorporating a removable cover;
    (b) an ultrafilter (15) which is arranged inside the containment (1) and has a pressure-resistant casing (8) open at one of its ends (8a) provided with a connecting flange (9), and which contains a removable ultrafiltration assembly (10) which can be introduced or removed via an orifice in the casing (8), and an inlet connection piece (12) for liquid to be purified, a filtrate-outlet connection piece (16) and a concentrate-outlet connection piece (14) passing through the pressure-resistant casing (8);
    (c) a concentrate circulation pump (25) fastened to the removable cover (7) of the containment (1) and incorporating a connecting flange (26) matching the connecting flange (9) of the pressure-resistant casing (8), to form together with this casing (8), when the removable cover (7) and the pump (25) are in the operating position, a closed and leak-proof volume in which the concentrate is made to circulate by means of the pump (25);
    (d) a heat exchanger (32) placed in the containment (1) and connected to the concentrate-oulet connection piece (14) penetrating into the heat exchanger (32) cooling the concentrate, as well as to a cooled-concentrate discharge connection piece (35) and to an inlet connection piece (37) and an outlet connection piece (39) for cooling fluid;
    (e) connection means (13, 17, 36, 38, 40) fastening respectively to the inlet connection piece (12) for liquid to be purified, to the filtrate-outlet connection piece (16), to the concentrate discharge connection piece (35) and to the inlet and outlet connection pieces (37, 39) for cooling fluid, outside the containment (1), these connection pieces passing through the walls (2) of the containment in a leak-proof manner; and
    (f) a heat-insulating material (41) in divided form which fills the free volume of the containment (1).

2. Modular device according to claim 1, comprising beams (50) radially arranged between the casing (8) of the ultrafilter (15) and the inner wall of the containment (1), to absorb forces which can arise under accidental conditions.

3. Modular device according to claim 1, wherein the casing (8) of the ultrafilter (15) is a substantially cylindrical shape with a vertical axis ZZ' and is open in its upper part, and the assembly consisting of the removal cover (7), the pump (25) and its flange (26) comes to rest on the connecting flange (9) of the casing (8).

4. Modular device according to claim 3, wherein the pump (25) has a lifting ring (32) for selectively lifting and putting down the assembly resting on the flange (9) of the casing (8) of the ultrafilter (15).

5. Modular device according to claim 3, wherein the removable cover (7) of the containment (1) has holes (29) in a vertical line with means of fastening the flanges (26 and 9) to one another.

6. Modular device according to claim 1, wherein the containment (1) incorporates lifting rings (31) for transporting it and installing it in the reactor as a single unit.

7. Modular device according to claim 1, wherein the ultrafilter (15) incorporates partitionings (21, 22) for guiding the concentrate and the filtrate inside the casing (8) and inside the ultrafiltration assembly (10) respectively.

* * * * *